United States Patent [19]

Kojima

[11] Patent Number: 5,036,405

[45] Date of Patent: Jul. 30, 1991

[54] IMAGE AMENDING METHOD

[75] Inventor: Toshihiro Kojima, Tokyo, Japan

[73] Assignee: Canon Kabushiki Kaisha, Tokyo, Japan

[21] Appl. No.: 411,251

[22] Filed: Sep. 25, 1989

Related U.S. Application Data

[63] Continuation of Ser. No. 120,103, Nov. 13, 1987, abandoned.

[30] Foreign Application Priority Data

Nov. 19, 1986 [JP] Japan ............................... 61-276216
Nov. 19, 1986 [JP] Japan ............................... 61-276217

[51] Int. Cl.$^5$ ............................................. H04N 5/21
[52] U.S. Cl. .................................... 358/448; 358/447
[58] Field of Search ........................... 382/54, 27, 50; 358/447, 448, 452, 455, 457, 463, 464, 213.17

[56] References Cited

U.S. PATENT DOCUMENTS

| | | | |
|---|---|---|---|
| 3,997,912 | 12/1976 | Zsagar .................................. | 358/78 |
| 4,298,895 | 11/1981 | Arai et al. ............................. | 382/54 |
| 4,506,382 | 3/1985 | Hada et al. ............................ | 382/54 |
| 4,510,618 | 4/1985 | Ataman et al. ....................... | 382/54 |
| 4,691,365 | 9/1987 | Nagashima ........................... | 382/54 |
| 4,724,488 | 2/1988 | Van Daele et al. .................. | 358/463 |
| 4,783,840 | 11/1988 | Song ...................................... | 382/27 |
| 4,827,533 | 5/1989 | Tanaka .................................. | 382/27 |
| 4,894,729 | 1/1990 | Murayama et al. ................. | 358/447 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image amending method for amending a signal indicative of an image which was photoelectrically converted comprises: classifying pixels which constitute a digital image into extraordinary pixels which need to be amended and ordinary pixels which do not need to be amended; setting an attention pixel; when the attention pixel is an extraordinary pixel, amending the data thereof by setting data of a peripheral ordinary pixel (other than pixels adjacent at the positions adjacent to the attention pixel in the upper, lower, left, and right directions) as amendment data for the extraordinary attention pixel; and, preferably, limiting a range of the peripheral pixels which are substituted for the extraordinary attention pixel. When no ordinary pixel exists in this range, in the amending step, the data of a previously amended peripheral pixel is set as the data of the attention pixel. With this method, a person without much experience can easily satisfactorily amend the image.

11 Claims, 8 Drawing Sheets

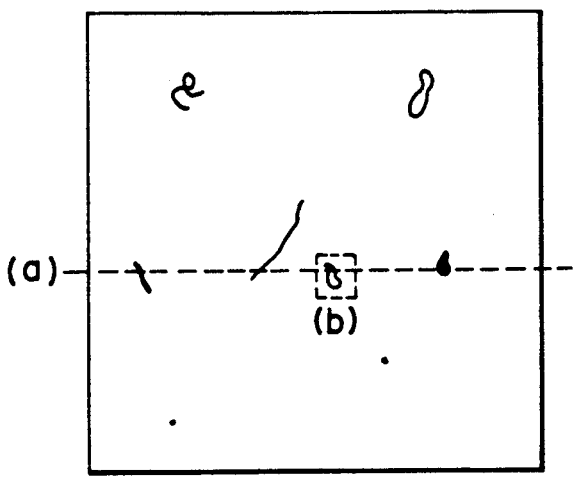
FIG. 3
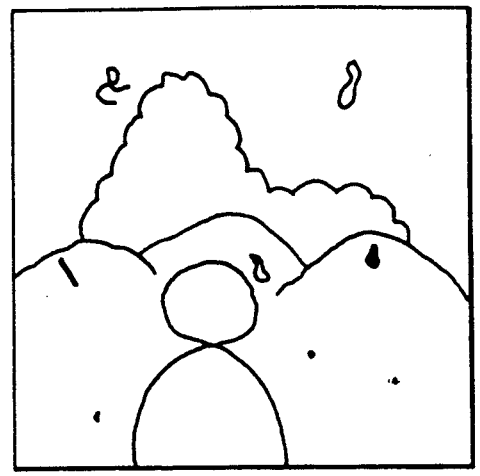
FIG. 2
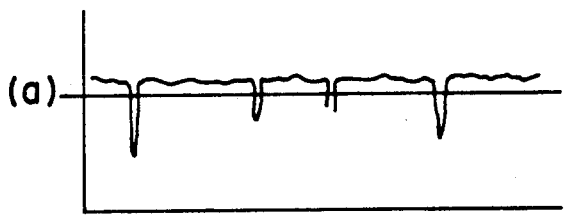
FIG. 4
```
0 0 0 0 0 0 0 0 0 0 0 0 0 0 0 0 0 0
0 0 0 1 1 1 0 0 0 0 0 0 0 0 0 0 0 0
0 0 0 1 1 1 1 0 0 0 0 0 0 0 0 0 0 0
0 0 0 0 1 0 0 1 1 0 0 0 0 0 0 0 0 0
0 0 0 0 1 1 0 0 1 1 0 0 0 0 0 0 0 0
0 0 0 0 0 1 0 0 0 1 0 0 0 0 0 0 0 0
0 0 0 0 0 1 1 0 0 0 1 0 0 0 0 0 0 0
0 0 0 0 0 1 1 0 0 0 1 0 0 0 0 0 0 0
0 0 0 0 0 1 1 0 0 0 1 0 0 0 0 0 0 0
0 0 0 0 0 1 0 0 0 0 1 0 0 0 0 0 0 0
0 0 0 0 0 1 0 0 0 0 1 1 0 0 0 0 0 0
0 0 0 0 0 1 0 0 0 0 0 1 1 0 0 0 0 0
0 0 0 0 0 1 0 0 0 0 0 0 1 1 0 0 0 0
0 0 0 0 0 1 1 0 0 0 0 0 0 1 0 0 0 0
0 0 0 0 0 0 1 0 0 0 0 0 0 1 0 0 0 0
0 0 0 0 0 0 0 1 0 0 0 0 1 0 0 0 0 0
0 0 0 0 0 0 0 0 1 1 1 1 0 0 0 0 0 0
0 0 0 0 0 0 0 0 0 0 0 0 0 0 0 0 0 0
```
FIG. 5

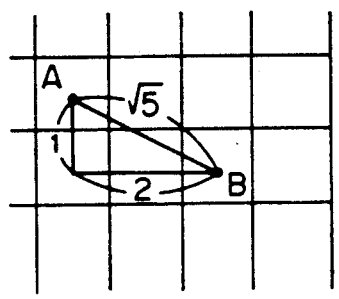
FIG. 6A
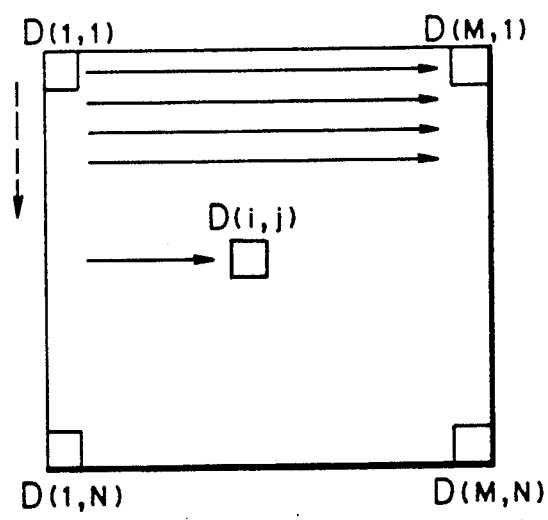
FIG. 6B
FIG. 7

PROCESSED AREA

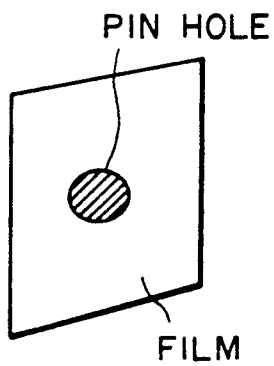
FIG. 11A
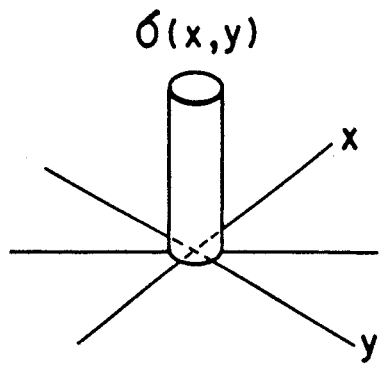
FIG. 11B
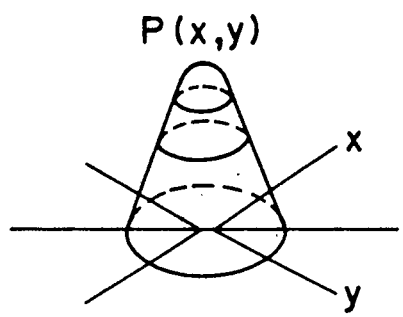
FIG. 11C
FIG. 12

IMAGE AMENDING METHOD

This application is a continuation of application Ser. No. 120,103 filed Nov. 13, 1987.

BACKGROUND OF THE INVENTION

1. Field of the Invention

The present invention relates to an image amending method for amending a signal indicative of a photoelectrically converted image.

2. Related Background Art

Hitherto, there has been known a method whereby a part of digital image data which has been read by an image pickup device such as image pickup tube, CCD sensor, or the like is replaced by other data on the basis of a given condition, thereby amending the image data. This amending method is performed in the field of photography and is called a retouch.

Such retouching relates to a method whereby the portion to be amended in the image on a film or printing paper is painted by means of a fine pen in a color which is determined from the image around this portion. By this method, for example, a mole on a face is erased or the appearance of a face, e.g., before or after shaving, is modified by erasure of some features in the image. Or, the shadow which would be printed on the printing paper by dust deposited on the film or by a scratch on the film is erased when the image is printed onto the printing paper.

However, this erasing work is very fine and, in general, since a pigment is mixed to make a coloring agent to be printed, it is difficult to properly adjust this color. It is hard for an inexperienced person to perform a satisfactory amendment.

On the other hand, in the field of digital image processing work which is equivalent to the abovementioned procedure is realized by a computer. In this case, the image to be amended is enlargedly displayed on a monitor display. The positions of the pixels of suitable color to cover the positions of the pixels to be amended are designated from the position near the portion to be amended (pixels to be amended) by a position designating apparatus such as a digitizer or the like. A set of image data corresponding to these positions is read and stored. The positions of the pixels to be amended are designated by the position designating apparatus. The set of data stored is written into the memory corresponding to the positions designated. Thus, the work of retouching which is performed in the field of photography is realized by the computer.

A digital image is composed of a number of pixels, and the pixel can be handled as a minimum unit. For the retouch in the digital image process, the image is first enlargedly displayed on a monitor and thereafter, the pixels can be designated. Therefore, fine works as described above is unnecessary. In addition, the image data around the pixel to be amended can be easily used. Further, since the position of the pixel to be amended is designated on a pixel unit basis, the amending range is not wider than is needed. As compared with the retouch in the field of photography, there is the advantage that persons without great experience can also perform a satisfactory amendment with respect to the foregoing points.

According to the conventional method using the computer, when the number of pixels to be amended is small, the number of amending operations is relatively small. However, since the image data consists of a very large number of pixels (for example, one frame of image of the ordinary TV level consists of about 250,000 pixels and the finer image can consist of a million pixels or more), even if a very small region is amended, several tens of pixels or even more may need to be amended. Thus, there is a problem that in the foregoing procedure carried out by means of computer, the operations of amending the pixels are actually very complicated and need a long time.

SUMMARY OF THE INVENTION

The present invention is made in consideration of the problems in the foregoing conventional methods, and it is an object of the invention to provide an image amending method whereby even, if an ordinary person without great experience can satisfactorily amend an image, and such that its operation for such amending is easy.

Practically speaking, in one version of the invention, the data of an ordinary pixel peripheral to a pixel of interest (hereinafter, the "attention pixel"), other than the pixels at the adjacent positions in the upper, lower, right, and left directions is set as the pixel data of the attention to pixels.

According to another aspect, of the invention, when the data of the peripheral pixel to be substituted is not ordinary pixel data, the data of another peripheral pixel is set as the pixel data of the pixel to be amended.

According to still another aspect of the invention, a range of the peripheral pixels to be substituted for the pixels to be amended is limited.

According to still another aspect of the invention, the data of the amended pixels is smoothed using the data of a plurality of peripheral pixels.

The above and other objects, features and advantages of the present invention will become more fully apparent from the following detailed description of the preferred embodiments and the appended claims with reference to the accompanying drawings.

BRIEF DESCRIPTION OF THE DRAWINGS

FIG. 2 is a diagram showing the visible light component of an image which has been influenced by dust or scratches;

FIG. 3 is a diagram showing the infrared light component of the image in FIG. 2;

FIG. 4 is a diagram showing a constitution of the data of the portion (a) in FIG. 3;

FIG. 5 is a diagram showing an example of the binarized bit plane data the portion of (b) in FIG. 3;

FIGS. 6A, 6B, 7, 8A, 8B, 8C, 8D, 9A, 9B, and 9C are pixel arrangement diagrams for explaining the principle of the above embodiment;

FIGS. 11A, 11B, and 11C are explanatory diagrams of the "shade off" process;

FIG. 12 is a diagram showing a constitution of a filter for the "shade off" process.

DETAILED DESCRIPTION OF THE PREFERRED EMBODIMENTS

An explanation will be made hereinbelow with respect to the case where digital image is input from a film on which dust and scratches are present, the positions of the dust and scratches on an film are detected using the infrared light component data, and the images of the dust and scratches are eliminated, thereby amending the image.

Figure 10:
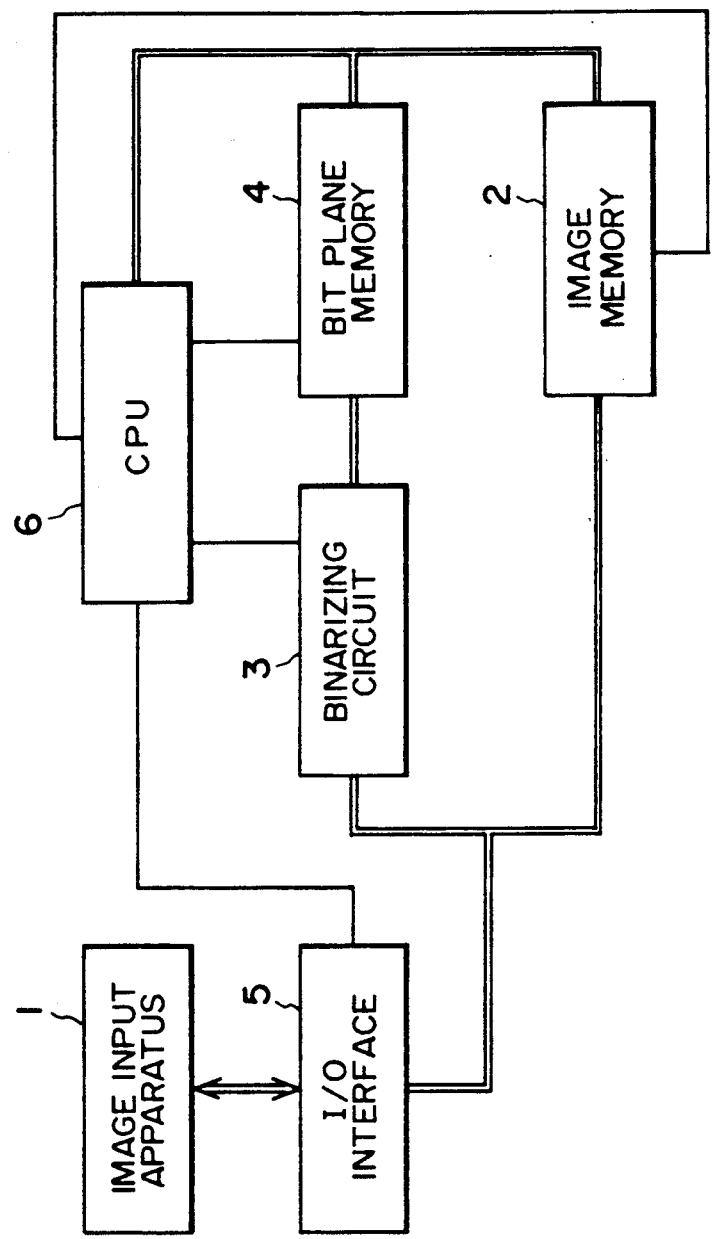
FIG. 10 is a block diagram showing a construction of the first and second embodiments.

FIG. 10 is a block diagram showing a construction of a circuit for carrying out the first and second embodiments of the invention. For each of these embodiments the circuit comprises: an image input apparatus 1; an image memory 2 to store the image data; a binarizing circuit 3 to binarize the image data; a bit plane memory 4 to store the binarized image data; an I/0 interface 5 to connect the input apparatus 1 with the image memory 2 and binarizing circuit 3; and a CPU 6 to perform the processing and control.

The visible light component data in the image data of the film which has been read by the image input apparatus 1 is stored in the image memory 2. The infrared light component data is binarized by the binarizing circuit 3 and thereafter, is stored in the bit plane memory 4.

The CPU 6 reads out the contents of the image memory 2 and bit plane memory 4 and performs the processing, explained hereinbelow.

The infrared light component transmitted through the film does not include the image data photographed on the film and is constituted by data such as dust, scratches, and the like as shown in FIG. 3. FIG. 2 shows the image data in this case.

FIG. 4 is a diagram showing the image data of the portion (a) in FIG. 3.

In FIG. 4, there are typical differences between the positions of the dust and scratches and the positions of other images than those. Therefore, the infrared light component data is binarized by a proper threshold value, thereby forming a bit plane indicative of the positions of dust and scratches.

FIG. 5 is a diagram showing a bit plane of the portion (b) in FIG. 3.

In this bit plane, the positions of dust and scratches are indicated as "1" and the positions of other images are represented as "0".

The first embodiment of the operation to amend the image on the basis of the bit plane and image data will now be explained.

The fundamental concept of the first embodiment of the invention is as follows.

The first fundamental concept is based on the point that in selecting the data to be substituted for the original data of the pixel to be amended, the priority is given to the ordinary pixels (except that which needs to be amended or those the data of which has already been amended) which exist near the pixel to be amended. The distance between pixels is taken as the distance between the centers of the pixels, as shown in FIG. 6A.

FIG. 6B is a diagram showing a state in which the (5×5) pixels around an attention pixel (the pixel to which attention is at present being paid for possible amendment) X are classified into groups A, B, ..., E as shown, in accordance with their closeness to the attention pixel X.

The object pixels relate to the natural image which was input from a film or the like. In general, in natural images, the probability that completely identical pixel data is continuously generated over a period of time is small. This is because (1) the objects photographed on the film are hardly uniform, (2) when an object is recorded on a film or the like, the noise of the medium is added, and (3) when a object image is input as the digital image, noise is added.

It is unnatural that identical data exists both as an attention pixel and at the pixel(s) which may be considered as data therefor. Therefore, an image is set into a state in which the probability of such identical data is small. This is the second fundamental concept.

Further, as the pixels are further away from the attention pixel, the correlation among the pixels generally decreases. Therefore, when the data is extracted from the more distant pixels, the probability that this data is inappropriate as data for amendment rises. On the other hand, since the number of data to be arithmetically operated upon per amending pixel increases, the operating time also becomes long. Therefore, an upper limit is provided for the matrix size. This is the third concept.

FIG. 7 is a diagram showing the relation between the position of the pixels and the suffixes, or indices, used herein to denote pixel position.

The (M×N) pixel data are denoted D(i, j) and the bit plane positions as BP(i, j), wherein i=1, 2, ..., M and j=1, 2, ..., N. D(i, j) in FIG. 7 is set, by way of an angle, as the attention pixel.

Figure 1:
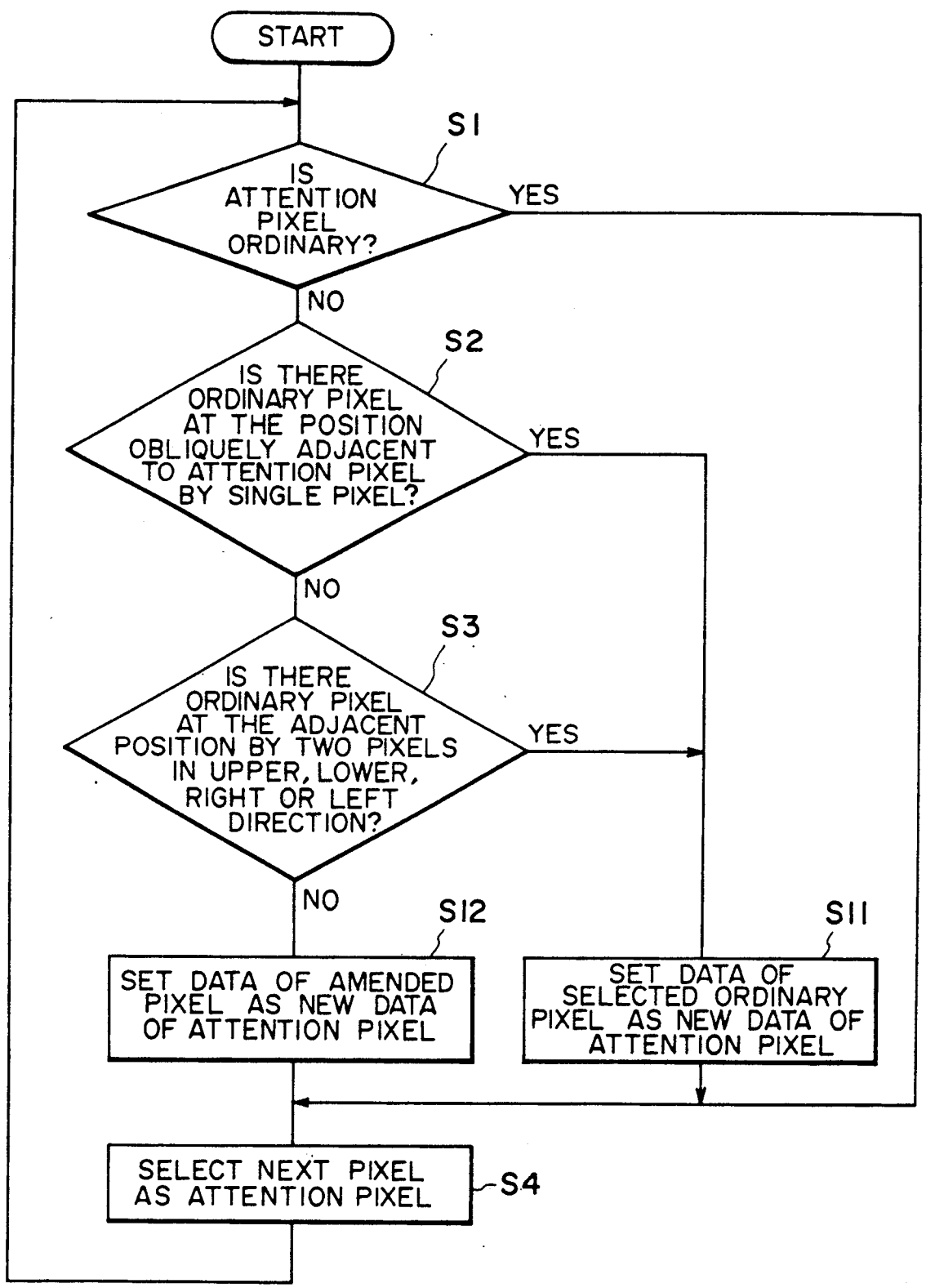
FIG. 1 is a flowchart showing a control procedure of the first embodiment of the present invention.

FIG. 1 is a flowchart showing a control procedure of the first embodiment of the invention.

The attention pixel (BP(i, j)) in the bit plane is checked and if it is an ordinary pixel ("0"), (step S1), the next pixel is selected as the attention pixel (step S4). For example, BP(i+1, j) can be selected next as the attention pixel.

Figure 8A:
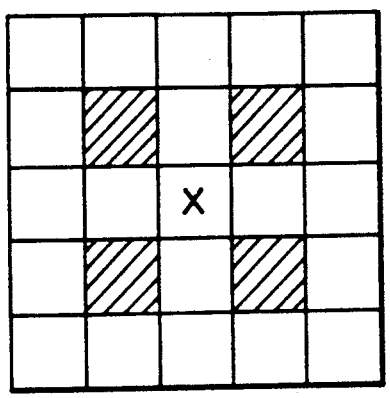

On the other hand, if the attention pixel (BP(i, j)) is extraordinary pixel ("1"), the pixels at the positions obliquely or diagonally adjacent to the attention pixel by a single pixel (the hatched pixels in FIG. 8A) are checked (step S2). In other words, a check is made to see if an ordinary pixel exists or not among the four pixels at BP(i−1, j−1), BP(i+1, j−1), BP(i−1, j+1), and BP(i+1, j+1). If one or more ordinary pixels exist among these four, an arbitrary one of the ordinary pixels is image data corresponding to the selected at random and the selected pixel is set as the new data of the attention pixel (step S11). Then, the next pixel is selected as the attention pixel (step S4).

Figure 8B:
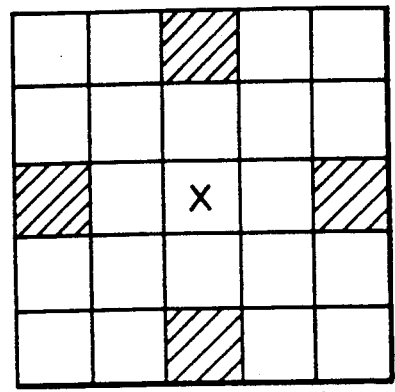

If all of the pixels examined in step S2 are extraordinary, the pixels (the hatched pixels in FIG. 8B) at the positions two pixels away from the attention pixel in the left, upper, right, and lower directions are checked (step S3). Namely, a check is made to see if an ordinary pixel exists among the four pixels at BP(i−2, j), BP(i, j−2), BP(i+2, j), and BP(i+2, j+2).

If an ordinary pixel exists among these four, an arbitrary one of the ordinary pixels is selected at random and the image data of the selected ordinary pixel is set as the new data of the attention pixel (step S11).

Figure 8C:
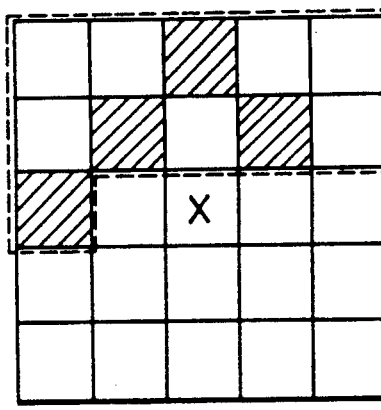

If all of the pixels examined in step S3 are extraordinary an arbitrary one of the four pixels (the hatched pixels in FIG. 8C) which are respectively at the positions obliquely or diagonally adjacent to the attention pixel in the left and right directions by a single pixel and the pixels at the positions adjacent to the attention pixel by two pixels in the left and upper directions is selected at random and the data of the selected pixel is set as the data of the attention pixel (step S12).

In this case, although those four pixels are inherently extraordinary pixels, since they are sequentially amended from the left upper position to the right lower position of the image as shown in FIG. 7, these four pixels are selected by reason of their having already been amended.

The above-mentioned processes are executed for the whole image. Since the foregoing algorithm cannot be applied to the pixels within two peripheral pixels of the edge of the image, the abovementioned processes are not performed.

The reason why the pixels at the positions adjacent to the attention pixel by a single pixel in the upper, lower, left, and right directions are not applied to the algorithm in step S2 will now be explained.

In step S2, when a similar algorithm is applied starting from pixels at positions adjacent to the attention pixel by a single pixel in the upper, lower, left, and right directions, if the size of the portion to be amended is $3 \times 3$ or more, the same data certainly continues over three pixels with respect to the position. This can be seen more clearly from FIG. 9A. In the diagram, the hatched portions are amended.

Figure 9A:
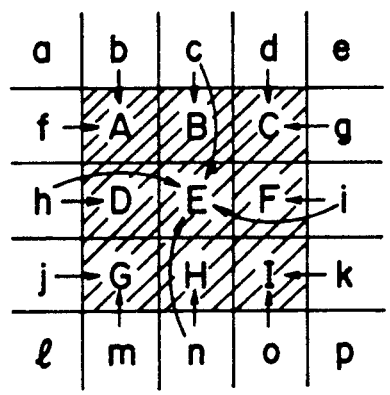

Now, assuming that the step of using the data at the positions adjacent in the upper, lower, left, and right directions has been applied, the data of c certainly comes to the position of B in FIG. 9A; the data of h to the position D; the data of i to the position F; and the data of n to the position H. In the same way, the data of either c, h, i, or n certainly comes to the position E. Therefore, one of the groups of c-B-E, h-D-E, n-H-E, and i-F-E certainly becomes identical data. Arrows shown in the diagram indicate the possibility regarding which data can be used.

Figure 9B:
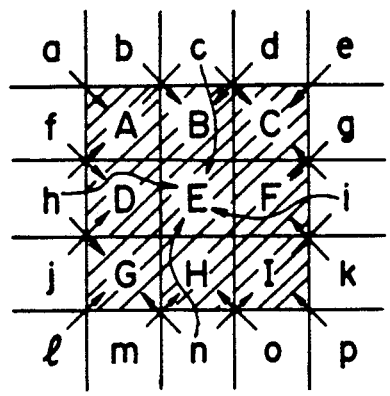
Figure 9C:
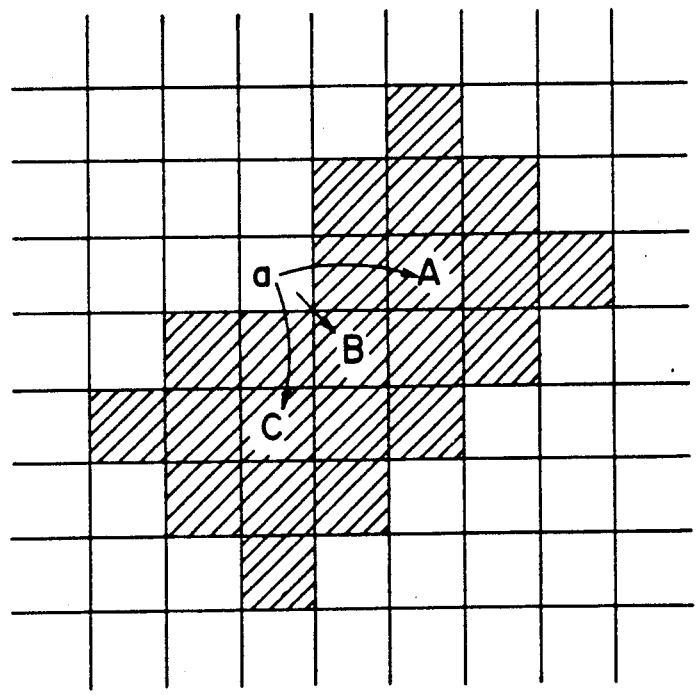

FIG. 9B is a diagram showing the case where the algorithm which has been proposed above was applied under the same condition as above. For example, the data of f or j comes to the position D. The data of one of c, h, i, and n comes to the position E. In this case, a situation such that identical data exists at three consecutive pixels does not occur. On the contrary, in the proposed algorithm, for example, as shown in FIG. 9C, only when the pixels to be amended lie within a wide range as shown in the hatched portion, and the data of a is moved to the positions of A, B, and C in the diagram, does identical data continues by three pixels.

Due to the above reason, no data is extracted from the pixels at the positions adjacent to the pixel to be amended in the upper, lower, left, and right directions on the basis of the second fundamental concept.

On the other hand, in the case of amending the attention pixel (extraordinary pixel) on the basis of the foregoing fundamental concepts, if predetermined data has been taken from another portion, when the image is englarged, the amended portion can be easily found out. The reason of this is as follows:

In general, when the image input apparatus inputs the image on a film, the image is certainly slightly shaded off. Namely, as shown in FIG. 11A, when a spot image exists on the film, a response as shown in FIG. 11B must be ideally obtained. However, a response as shown in FIG. 11C is actually derived. This phenomenon is called "shade off" in this specification. This "shade off" occurs because the influence of a certain spot image is exerted on the portions of image around it. Therefore, the pixel having the digital image data influences the data around it.

When considering the amended pixel, this amended pixel is obtained by merely moving the data from the peripheral pixel and exerts no influence on the peripheral pixel. This causes the amended pixel to become conspicuous the midst of the surrounding ordinary pixels.

Therefore, to prevent the amended pixel from becoming conspicuous among the ordinary pixels, after completion of the amendment of the data, with respect to the amended pixel (attention pixel), the weighted mean of the attention pixel and the peripheral data thereof is calculated (smoothed). In this case, if the mean is simply calculated, the image is too shaded off. Therefore, the weight is added by calculating the weighted mean so as to obtain the shade-off near the characteristic of the image input apparatus.

FIG. 12 is a diagram showing an example of a digital filter to shade off a pixel.

By changing N shown in this diagram, the degree of shade-off varies. Therefore, the value of N is properly set so as to obtain a characteristic near the characteristic of the image input apparatus and at this time, the weight of the weighted mean is added.

Figure 13:
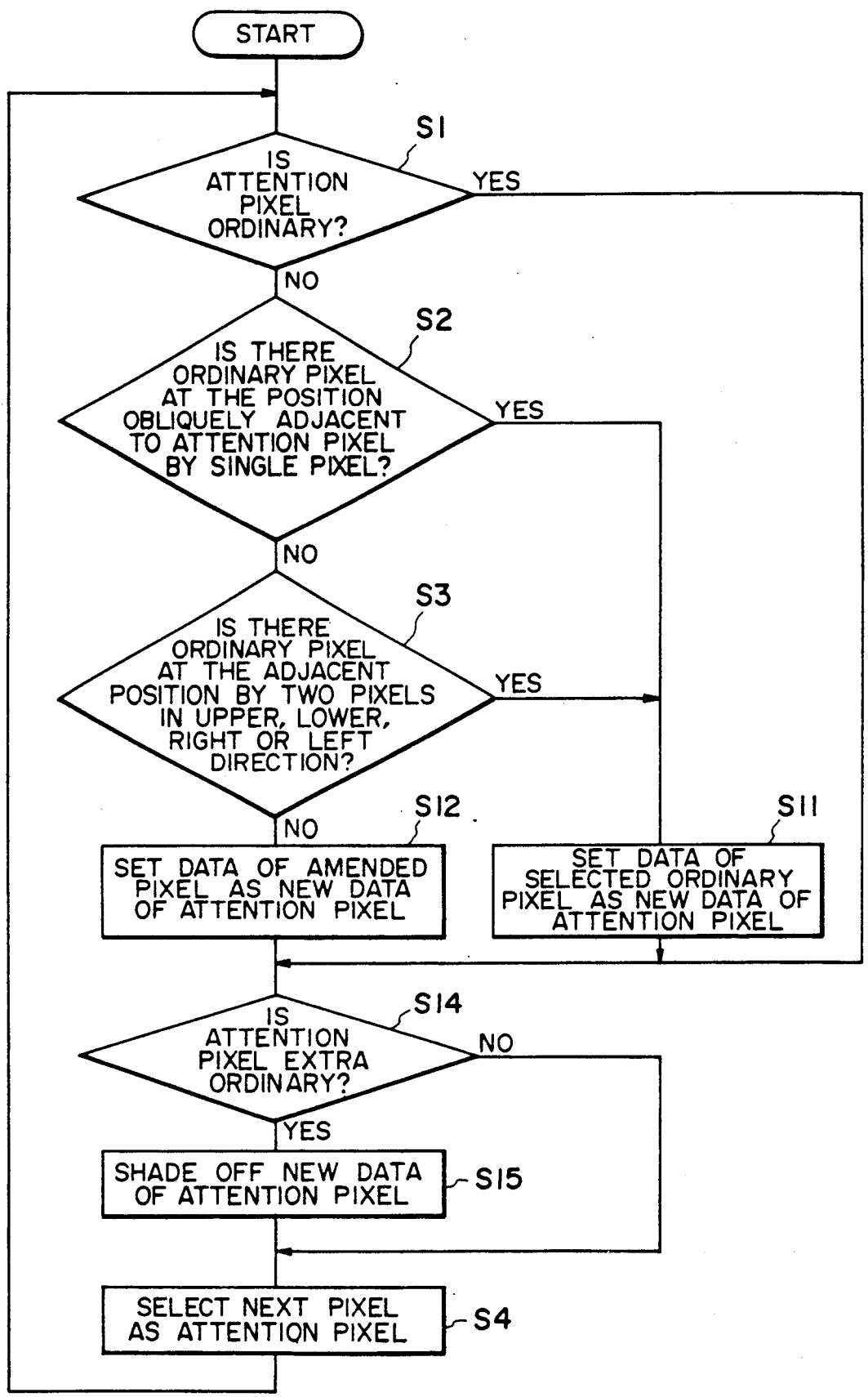
FIG. 13 is a flowchart showing a control procedure in the second embodiment.

FIG. 13 is a flowchart showing a control procedure of the second embodiment in which the shade-of process is further added to the first embodiment of FIG. 1. In FIG. 13, the same processes as those in the control procedure of FIG. 1 are designated by the same step number.

The attention pixel (BP(i, j)) in the bit plane is checked and if it is an ordinary pixel ("0") (step S1), step S14 follows.

On the other hand, if the attention pixel (BP(i, j)) is an extraordinary pixel ("1"), the pixels at the positions obliquely adjacent to the attention pixel by a single pixel in the upper, lower, right, and left directions (the pixels shown in the hatched portions in FIG. 8A) are checked (step S2). Namely, a check is made to see if an ordinary pixel exists among the four pixels of BP(i−1, j−1), BP(i+1, j−1), BP(i−1, j+1), and BP(i+1, j+1). If one or more ordinary pixels exist among those four, an arbitrary one of the ordinary pixels is selected at random and the selected image data is set as the new data of the attention pixel (step S11). Then, step S14 follows.

If all of the pixels examined in step S2 are the extraordinary pixels, the pixels at the positions adjacent to the attention pixel by two pixels in the left, upper, right, and lower directions (the pixels indicated in the hatched portions in FIG. 8B) are checked (step S3). Namely, a check is made to see if an ordinary pixel exists or not among the four pixels at BP(i−2, j), BP(i, j−2), BP(i+2, j), and BP(i+2, j+2).

If an ordinary pixel exists among the latter four, an arbitrary one of the ordinary pixels is selected at random and the image data of the selected ordinary pixel is set as the new data of the attention pixel (step S11).

If all of the pixels examined in step S3 are extraordinary pixels, an arbitrary one of the four pixels (the pixels shown in the hatched portions in FIG. 8C) at the positions obliquely or diagonally adjacent to the attention pixel by a single pixel in the left and right directions and the pixels at the positions adjacent to the attention pixels by two pixels in the left and upper directions is selected at random and the data of the selected pixel is set as the data of the attention pixel (step S12).

In this case, although those four pixels were inherently extraordinary pixels, they are sequentially amended from the left upper direction to the right lower direction of the image as shown in FIG. 7, so that they are the four pixels selected by reason of having already been amended.

Figure 8D:
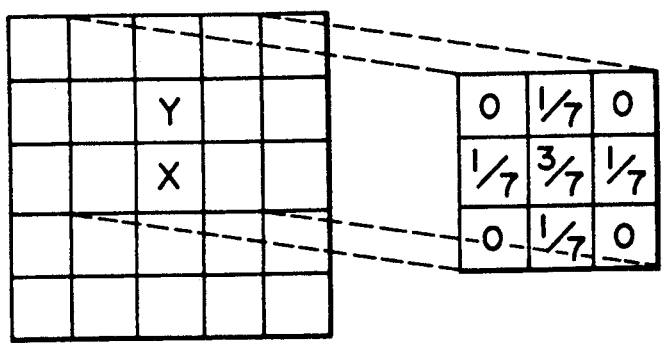

If the pixel Y (indicated in FIG. 8D) existing over the attention pixel X is an extraordinary pixel (step S14), namely, if BP(i, j−1) is "1", the extraordinary pixel Y over the attention pixel X is shaded off (step S15). In other words, the image data of the attention pixel is replaced by D(i, j−1) shown by the following equation:

$$D(i, j-1) = \{3 \times D(i, j-1) + D(i-1, j-1) + D(i, j-2) + D(i, j) + D(i+1, j-1)\}/7$$

This equation relates to the example when N is set to 3 in FIG. 12. The data obtained by the calculation of the weighted mean is used as the final data of the attention pixel. Thus, the "shade off" of the attention pixel is performed.

After completion of the processing of the present attention pixel, the next pixel is set as the new attention pixel (step S4) and the processing routine is returned to step S1. In this manner, the foregoing processes are executed with respect to the whole image. Similarly to the first embodiment, since the foregoing algorithm cannot be applied to the pixels within a range of two peripheral pixels of the image, the foregoing processing are not so performed.

The attention pixel is amended in this manner and the "shade off" process is executed with respect to the amended pixel, so that the amended pixel is inconspicuous.

On the other hand, since identical data does not occur at several consecutive pixels in the amended image, the occurrence of a sense of incompatibility due to the amendment can be prevented.

Further, since the pixels which are used for amendment are limited to those in the peripheral region, the amendment can be effectively performed and a circuit scale for the amendment can be reduced or a high operating speed can be realized.

Although the first and second embodiments have been described with respect to the example in which dust and scratches are amended by use of the infrared light component, other conditions may be also given such as positional limitation such as a face, limitation of color such as a color near black, or the like as in a case where the some element of the facial after shaving in the face is erased (is amended) or the like.

As described above, according to the invention, there are the effects that inexperienced persons can satisfactorily amend the image and amending operation according to the inventor.

The present invention is not limited to the foregoing embodiments but many modifications and variations are possible within the spirit and scope of the appended claims of the invention.

I claim:

1. An image amending method comprising the steps of:
   classifying pixels which are represented by digital image data into extraordinary pixels which need to be amended and ordinary pixels which do not need to be amended;
   setting an attention pixel; and
   when the attention pixel is an extraordinary pixel, amending the attention pixel by setting the digital image data corresponding to a peripheral ordinary pixel, other than pixels at positions adjacent to the attention pixel in the upper, lower, right, and left directions, as amendment data corresponding to the attention pixel.

2. A method according to claim 1, further comprising the step of limiting a range of the peripheral pixels which are substituted for the attention pixel.

3. A method according to claim 2, wherein, when no ordinary pixel exists within the range, in said amending step, the data corresponding to the peripheral pixel is used as the data corresponding to the attention pixel.

4. A method according to claim 1, further comprising the step of smoothing the data corresponding to the attention pixel, after amendment thereof in said amending step, bu use of data corresponding to the peripheral pixel.

5. An image amending method comprising the steps of:
   classifying pixels which are represented by digital image data into extraordinary pixels which need to be amended and ordinary pixels which do not need to be amended;
   setting an attention pixel;
   when the attention pixel is an extraordinary pixel, amending the digital data corresponding to the attention pixel by setting the digital image data corresponding to an ordinary pixel at a position away from the attention pixel by a first predetermined distance as amendment data corresponding to the attention pixel; and
   when all of the pixels at positions away from the attention pixel by the first predetermined distance are extraordinary pixels, amending the digital data corresponding to the attention pixel by setting the digital data corresponding to an ordinary pixel at a position away from the attention pixel by a second predetermined distance as amendment data corresponding to the attention pixel.

6. A method according to claim 5, wherein said second predetermined distance is longer than said first predetermined distance.

7. A method according to claim 5, wherein the pixels which are used in said amending steps are not pixels at positions adjacent to the attention pixel in the upper, lower, right directions.

8. A method according to claim 5, further comprising the step of limiting a range of the peripheral pixels which are substituted for the attention pixel.

9. A method according to claim 8, further comprising a third amending step in which, when no ordinary pixel exits in said range, the data corresponding to the peripheral amended pixel is set as the data corresponding to the attention pixel.

10. A method according to claim 5, further comprising the step of smoothing the data corresponding to the attention pixel, after amendment thereof, by use of data corresponding to the peripheral pixel.

11. An image amending method comprising the steps of:
   classifying pixels which are represented by digital image data into extraordinary pixels which need to be amended and ordinary pixels which do not need to be amended;
   setting an attention pixel;
   when the attention pixel is an extraordinary pixel, amending the digital image data corresponding to the attention pixel by setting data corresponding to a pixel peripheral of the attention pixel as amendment data corresponding to the attention pixel; and
   smoothing the amendment data by using digital image data corresponding to at least one pixel peripheral to the attention pixel, after amendment of the digital image data corresponding to the attention pixel in said amending step, wherein the pixels whose data is used in said amending step are not the pixels at positions adjacent to the attention pixel in the upper, lower, right, and left directions.

* * * * *

UNITED STATES PATENT AND TRADEMARK OFFICE
CERTIFICATE OF CORRECTION

PATENT NO. : 5,036,405
DATED : July 30, 1991
INVENTOR(S) : TOSHIHIRO KOJIMA

It is certified that error appears in the above-identified patent and that said Letters Patent is hereby corrected as shown below:

IN [57] ABSTRACT

Line 9, "adjacent" (first occurrence) should be deleted.

COLUMN 1

Line 37, "cessing" should read --cessing,-- and "abovemen-" should read --above-men- --.
    Line 54, "retouch" should read --retouching--.
    Line 56, "works" should read --work--.
    Line 62, "touch" should read --touching--.

COLUMN 2

Line 16, "even, if" should read --even--.
    Line 23, "directions" should read --directions,--.
    Line 24, "to pixels." should read --pixel.--.
    Line 25, "aspect," should read --aspect--.

COLUMN 3

Line 2, "an" should read --the-- and "the" (second occurrence) should read --an--.
    Line 20, "thereafter," should read --thereafter--.
    Line 23, "ing," should read --ing--.
    Line 50, "the priority" should read --priority--.
    Line 51, "the" should be deleted.

UNITED STATES PATENT AND TRADEMARK OFFICE
CERTIFICATE OF CORRECTION

PATENT NO. : 5,036,405
DATED : July 30, 1991
INVENTOR(S) : TOSHIHIRO KOJIMA

It is certified that error appears in the above-identified patent and that said Letters Patent is hereby corrected as shown below:

COLUMN 4

Line 1, "a" should read --the-- and "the" should read --a--.
    Line 3, "as" should read --at--.
    Line 5, "data" should read --amending data--.
    Line 8, "further" should read --farther--.
    Line 22, "angle," should read --example,--.
    Line 31, "is" should read --is an--.
    Line 41, "image data corresponding to the" should be deleted.
    Line 42, "the selected" should read --the image data corresponding to the selected--.
    Line 53, "the" should read --these--.
    Line 57, "nary" should read --nary,--.

COLUMN 5

Line 6, "abovementioned" should read --above-mentioned--.
    Line 16, "3 X 3" should read --3 X 3 pixels-- and "the same" should read --identical--.
    Line 27, "groups of" should read --groups--.
    Line 42, "continues by three pixels." should read --exist in three neighboring pixels.--.
    Line 45, "directions" should read --directions,--.

COLUMN 6

Line 21, "shade-of" should read --shade-off--.
    Line 41, "the" (second occurrence) should be deleted.

UNITED STATES PATENT AND TRADEMARK OFFICE
CERTIFICATE OF CORRECTION

PATENT NO. : 5,036,405
DATED : July 30, 1991
INVENTOR(S) : TOSHIHIRO KOJIMA

It is certified that error appears in the above-identified patent and that said Letters Patent is hereby corrected as shown below:

COLUMN 7

Line 42, "the some" should read --some--; "facial" should read --facial appearance of a mate--; and "in the" should be deleted.
    Line 43, "face" should be deleted.
    Line 46, "image and" should read --image, and the--.
    Line 47, "inventor." should read --invention is easy.--.

COLUMN 8

Line 8, "bu" should read --by--.
    Line 36, "lower, right directions." should read --lower, left, and right directions.--.
    Line 42, "exits" should read --exists--.

Signed and Sealed this

Sixth Day of April, 1993

*Attest:*

STEPHEN G. KUNIN

*Attesting Officer*     *Acting Commissioner of Patents and Trademarks*